US009755976B2

(12) United States Patent
Bai et al.

(10) Patent No.: US 9,755,976 B2
(45) Date of Patent: Sep. 5, 2017

(54) METHOD AND APPARATUS FOR REMOTE VEHICLE SCREEN OPERATION

(71) Applicant: GM GLOBAL TECHNOLOGY OPERATIONS LLC, Detroit, MI (US)

(72) Inventors: Fan Bai, Ann Arbor, MI (US); Dan Shan, Warren, MI (US); Donald K. Grimm, Utica, MI (US); Massimo Osella, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 14/565,708

(22) Filed: Dec. 10, 2014

(65) Prior Publication Data

US 2016/0170619 A1   Jun. 16, 2016

(51) Int. Cl.
  *G06F 3/048* (2013.01)
  *H04L 12/815* (2013.01)
  *H04L 29/08* (2006.01)
  *H04L 29/06* (2006.01)

(52) U.S. Cl.
  CPC ............ *H04L 47/22* (2013.01); *H04L 67/125* (2013.01); *H04L 67/14* (2013.01); *H04L 69/24* (2013.01)

(58) Field of Classification Search
  CPC ................................ H04L 67/14; H04L 69/24
  See application file for complete search history.

(56) References Cited

U.S. PATENT DOCUMENTS

| | | | | |
|---|---|---|---|---|
| 7,305,465 | B2 * | 12/2007 | Wing | G06Q 10/06 707/999.01 |
| 7,805,338 | B2 * | 9/2010 | Kolls | G06Q 30/02 345/672 |
| 8,468,451 | B1 * | 6/2013 | Rauba | G06F 3/048 715/705 |
| 8,819,550 | B2 * | 8/2014 | Evans | G01C 21/00 235/492 |
| 2003/0218632 | A1 * | 11/2003 | Altwies | G06F 3/14 715/740 |
| 2004/0139156 | A1 * | 7/2004 | Matthews | G06Q 30/01 709/204 |
| 2005/0154985 | A1 * | 7/2005 | Burkhart | G06F 9/4446 715/705 |
| 2011/0010389 | A1 * | 1/2011 | Shaffer | G06Q 10/10 707/770 |
| 2012/0317487 | A1 * | 12/2012 | Lieb | G06F 9/4445 715/730 |

* cited by examiner

*Primary Examiner* — Omar Abdul-Ali
(74) *Attorney, Agent, or Firm* — Quinn IP Law

(57) ABSTRACT

A method of remotely controlling a graphic display unit. Requesting, by a host system, assistance of a remote system relating to a respective application, host system including at least one host graphic display unit displaying operational graphics relating to a dedicated application of the host system. The at least one host graphic display unit of the host system is accessed by the remote system. Graphical application data relating to the respective application display is transmitted from the remote system to the host system. Instructional graphic information is projected on the at least one host graphics display unit. Remotely controlling, by the remote system, the at least one host vehicle graphic display unit by displaying to a user of the host system instructional information relating to the respective application. An adaptive session protocol controls a speed in which data is transmitted from the remote system to the host system.

21 Claims, 3 Drawing Sheets

METHOD AND APPARATUS FOR REMOTE VEHICLE SCREEN OPERATION

BACKGROUND OF INVENTION

An embodiment relates to configurable screen displays.

Accessing and remotely controlling graphic display screens is utilized on computers such as remote desktop services wherein a remote user is allowed to access the remote controller and take control of the program operating on the remote computer. The user of the host computer can see the desktop of the remote computer and can open and operate applications stored on the remote computer. However, such services only allow the remote user to access and control only those existing applications stored on the host computer. That is, the remote user is limited to only those applications currently residing on the host computer.

Such remote desktop services are often associated with two fixed terminals. Where a mobile terminal, such as a vehicle is involved, dynamic channel bandwidth is an issue due to vehicle movements. In addition, latency is a main issue if the distance between the mobile terminal and the fixed terminal is long. Such data transmission issues involve the source overwhelming the sink, since the source will keep transmitting information at a fixed rate, and in instances, a rate and volume that the sink is not capable of handling.

SUMMARY OF INVENTION

An advantage of an embodiment is the use of an adaptive session protocol that dynamically controls a speed in which data is transmitted from the remote system to the host system by dynamically adjusting a sampling rate of the framebuffer according to packet indices at a transport layer of the server, which avoids overwhelming a sink and reduces bandwidth of the communication channel to a minimum level required.

In addition, the embodiments described herein allow a remote entity to transmit graphic application data to one or more host graphic display units, which are primarily dedicated to other applications, and a user of the remote terminal can display instructional graphics on a host graphic display unit for teaching the user of the host graphic display unit how to operate a feature of the system (e.g., vehicle) that is not necessarily associated with the host graphics display unit, or on behalf of the user, perform user-requested operations. As a result, the application as running on the remote system is transmitted and projected on the host graphic display unit is still controlled by the remote user for providing instructional graphics relating to any feature that a host user may request assistance with. The adaptive session protocol applied to the transfer and projection of data on the host system enhances performance by decreasing bandwidth usage and reducing latency.

An embodiment contemplates a method of remotely controlling a graphic display unit. Requesting, by a host system, assistance of a remote system relating to a respective application, host system including at least one host graphic display unit displaying operational graphics relating to a dedicated application of the host system. The remote system including a remote graphical display unit. The remote system is in wireless communication with the host system. The at least one host graphic display unit of the host system is accessed by the remote system. Graphical application data relating to the respective application display is transmitted from the remote system to the host system. Instructional graphic information is projected on at least one host graphics display unit; remotely controlling, by the remote system, the at least one host vehicle graphic display unit by displaying to a user of the host system instructional information relating to the respective application. An adaptive session protocol controls a speed in which data is transmitted from the remote system to the host system.

DETAILED DESCRIPTION

Figure 1:
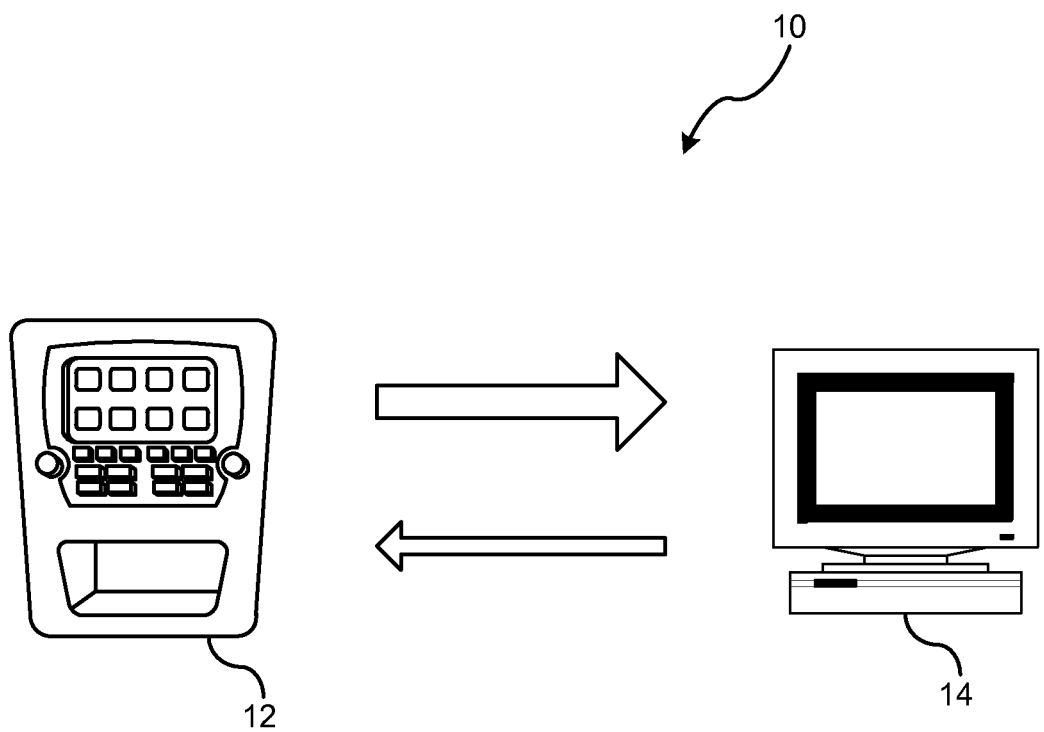
FIG. 1 is a remote vehicle screen access system.

FIG. 1 illustrates a remote vehicle screen access system 10. The system 10 includes a host system 12 and a remote system 14. The host system 12 may include, but is not limited to a vehicle. For example, the system 10 may be used in automotive systems, aircraft systems, education systems, or other non-automotive system. The host system 12 includes at least one host graphic display unit 16 and the remote system includes a remote terminal 18. The host graphic display unit 14 includes a graphical user interface (GUI) for allowing users to interact with electronic devices via graphical icons and other graphics or visual indicators in contrast to text-based messages. This also allows the use of graphic inputs as opposed to typing in commands.

The host graphic display unit 16 is capable of displaying operational graphics relating to one or more dedicated vehicle applications. For example, the host graphic display unit 16 may be part of a front console unit that provides graphics for multimedia controls and operations; however, the GUI is reconfigurable to allow reconfiguration of the display to other than the dedicated graphics typically displayed on the display.

The remote terminal 18 of the remote system 14 is a computer-based device or similar that is remote from the host system 12. The remote system 12 communicates wirelessly with the remote system 12. Both the host system 12 and the remote system 14 may include a dedicated transmitter and receiver for communication or may utilize shared transmitters and receivers utilized by other systems in the host system or facility where the remote system 14, respectively. Alternatively, the host system 12 and remote system 14 may be in communication utilizing OnStar®. OnStar® is a subscription-based communications service currently offered on vehicles manufactured by General Motors that provides services that include, but are not limited to, in-vehicle security, remote diagnostics systems, and turn-by-turn navigation via a vehicle-based communication unit that provides a wireless communication link between the vehicle and the remote infrastructure. Alternatively, an ad-hoc wireless communication network other than OnStar may be utilized.

Preferably, the host system is equipped with a Long-Term Evolution (LTE) data pipe which provides for wireless communication of high-speed data for mobile devices and other data terminals. This network technology increases a capacity and speed using a different radio interface together with core network improvements.

Figure 2:
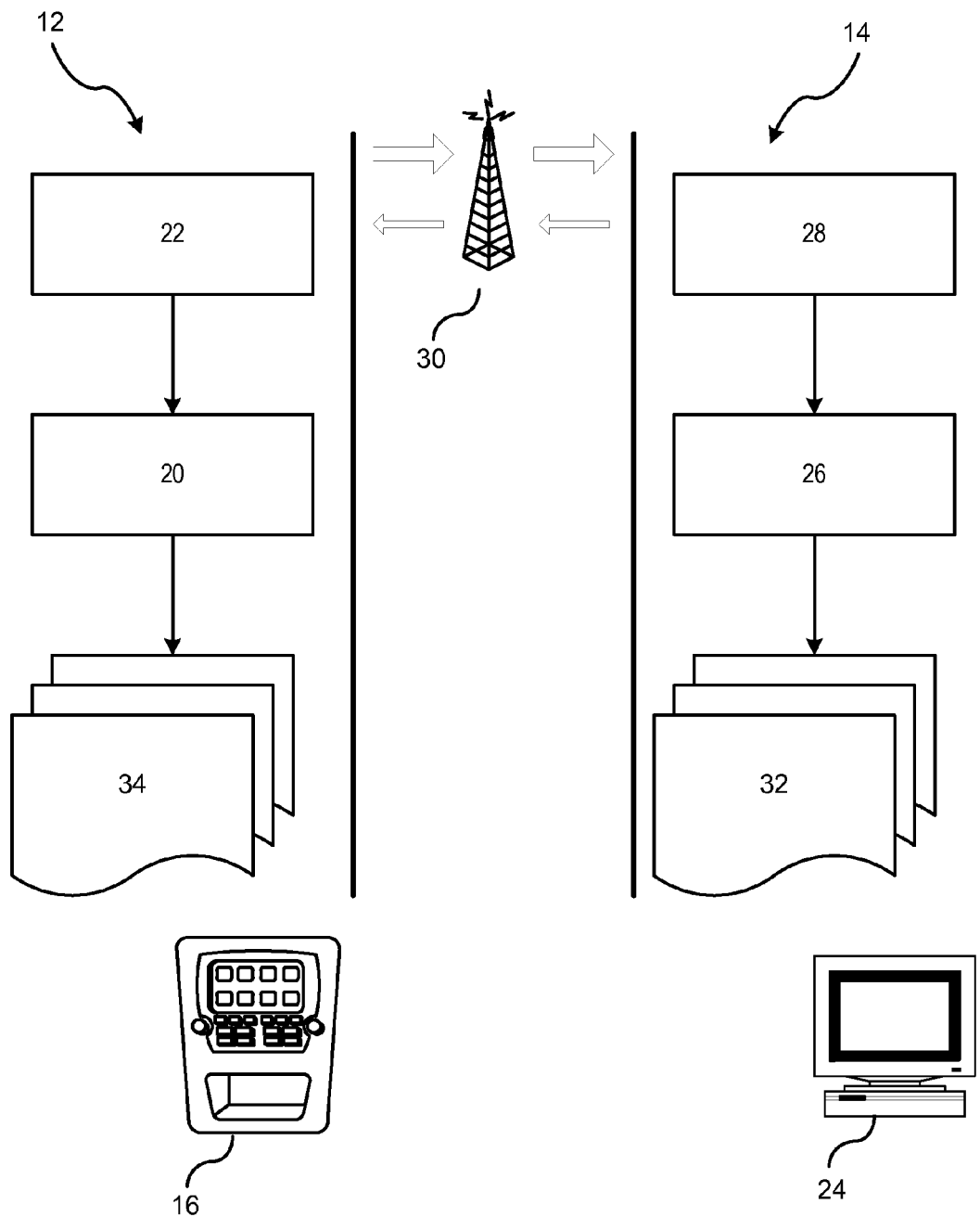
FIG. 2 is a block diagram of the system architecture.

FIG. 2 is illustrates a flow diagram for a system architecture of the system 10. Data flow and communication is both forward (e.g., display access) and reverse (e.g., remote operation). The system functions to display a respective graphic on the display of the host vehicle that is controlled by the remote terminal. The respective graphics and tutorial displayed on the each of the graphic display units can relate to information other than what each host graphic display unit is primarily dedicated to display. For example, while a vehicle graphic display unit may primarily display multimedia controls the display may be configured to display tutorials by the assisting device other than those related to primary multimedia controls. The advantage is that any vehicle related function including, but not limited to, vehicle functionality, instrument panel control functionality, accessory operations, or any other information related to operation of the vehicle function or accessory function may presented to the user through the host graphic display unit and controlled by a remote entity. This allows a user of the vehicle to request and receive instructions about how to operate a vehicle function utilizing graphic displays controlled by a remote entity. Alternatively, a remote entity may operate vehicle controls or remotely configure vehicle systems on behalf of the driver.

In FIG. 2, infrastructure of the host system 12 and the infrastructure of the remote system 14 have similar architectures, and in this manner, the end-to-end solution does not require a standard since both systems are governed by a same protocol.

The host system 12 includes one or more host graphic display units 16, a host graphic codec solution 20, and a host display client/server 22. Similarly, the remote system 14 includes a remote graphic display unit 24, a remote graphic codec solution 26, and a remote display client/server 28. Each of the systems may employ a respective processor for executing the functions or may utilize shared processors within each respective system. Both the host system 12 and the remote system 14 can function as a server for pushing data or client for pulling the data.

In an embodiment where the remote system 12 is the server and the host system 14 is the client, in response to a request by a user of the host vehicle 12, the host system 12 contacts the remote system 14 requesting assistance for an operation. The request is communicated through a wireless communication service 30. The service may be a service such as wireless cellular service or can be an ad hoc network. In response to the communication request, an operator of the remote terminal identifies the respective user application 32 that the operator of the host system requires assistance.

The system identifies an appropriate graphic codec solution 22 for compressing the data from the user application 32 required to be transmitted to the host system 12 and targeted host display 16. The graphic codec solution 22 is a compression-decompression algorithm for encoding a data stream for transmission to the host system 12 via the communication service 30.

The remote server facilitates data share information or other hardware and software source to the host system 12.

The host client allows a user of the vehicle to gain access to the data being transmitted by the remote system. The host client obtains the data received by the remote server.

The host graphic codec solution decompresses the data received by the host client. The decompressed data is graphically displayed on the graphic display unit. As a result, the instructions for utilizing an application 34 utilized by the host system can be projected onto the host display unit, despite the display unit being primarily designed for another application. This allows a knowledgeable expert at the infrastructure of the remote system to project graphical tutorials on the graphic display screen of host system for educating the user of the host system on how to utilize a respective function or operation of an application or operate the system on the behalf of or under the supervision of the user.

It should be understood that the vehicle may include multiple reconfigurable host graphic display units (e.g., center stack and instrument panel). Communication from the remote entity is communicated to the host system which is connected to or capable of addressing any of the host graphic display units in the vehicle. The access to each of the host graphic display units can also be simultaneous. For example, basic information such as the operator name could be displayed on a center stack graphic display while instructional information could be displayed on an instrument panel graphic display.

It should also be understood that the operations as described herein can be used in the forward direction or reverse direction. For example, in a vehicle environment, if a user needs to learn how to operate a speed control device, the remote system functions as the server and the host system functions as the client. A representative of the remote system can project its own desktop screen onto the graphic display unit of the vehicle directly. The representative can walk the user of the vehicle through a tutorial graphically illustrating the steps on how to operate speed control device by displaying the representative's desktop on the graphical display of the vehicle.

For a reverse direction operation, a customer new to a newly introduced application or feature could contact the representative of the remote system for assistance. In this instance, where the application or feature is one of the primary functions that the vehicle graphic display unit displays, the representative of the remote system could access the vehicle graphic display unit remotely and can control the vehicle graphic display unit of the vehicle from the remote location. Under the circumstances, the vehicle system is the server and the remote system is the client, where the vehicle system sends application data to the remote system so that the remote system can graphically build and display what the user is viewing on its display.

In both instances, since both ends are controlled by the representative of the remote terminal utilizing the same protocol, an end-to-end solution does not need to be standard.

Figure 3:
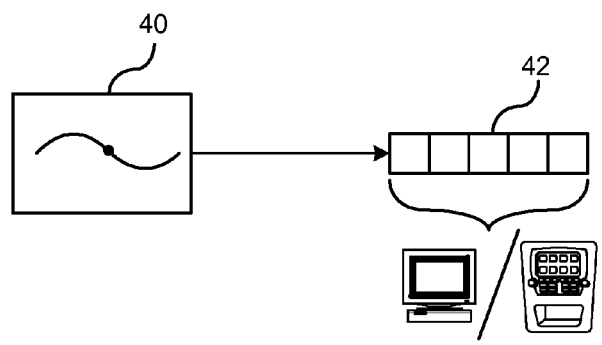
FIG. 3 is a graphical illustration of the wireless communication channel and jitter buffer

FIG. 3 illustrates a graphical illustration of the wireless communication channel and buffer unitizing an end-to-end session protocol that is used to govern the speed by which the graphical display unit of a source sends the captured framebuffer to a graphical display unit of a sink. This avoids the source from overwhelming the sink unnecessarily and adapts the cellular bandwidth to a minimum level required for transmission. Block 40 represents the wireless channel and block 42 represents a jitter buffer at the sink. The sink maintains an optional size of jitter buffer {n=f(App, BW)}. As the jitter buffer at the sink is consumed, the sink notifies the source to send another framebuffer. If the source does not receive instructions from the sink to send a framebuffer, the source will not send further updates. Therefore, the main concept is to dynamically adjust a sampling rate of the framebuffer according to packet indices at a transport layer of the server.

Figure 4:
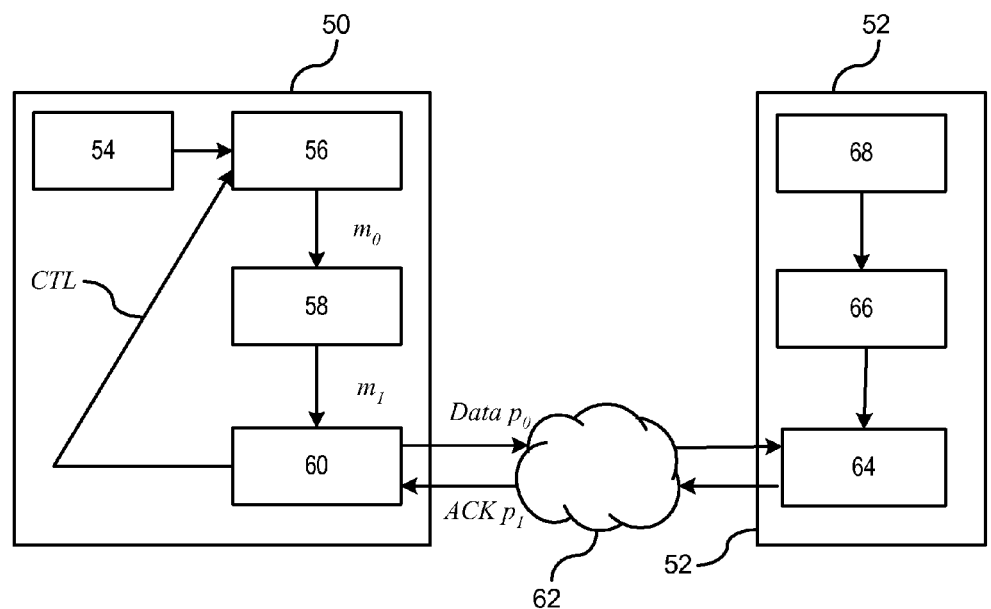
FIG. 4 is a flow diagram of the communication protocol between host system and the remote system.

FIG. 4 illustrates the communication protocol between host system and the remote system. For this example, the host system will be the vehicle 50 and the remote system is a call center 52 which provides assistance to a user of the vehicle. Block 54 represents a framebuffer. A framebuffer is a portion of RAM that includes a bitmap. The bitmap is driven to a graphic display from a memory buffer that contains a complete frame of data. The data in the memory buffer includes color values for each pixel displayed on the graphics display unit. The amount of the memory required to drive the framebuffer depends on the resolution of the output signal. In a framebuffer, an electric beam traces left-to-right and top-to-bottom path across the entire graphic display screen. At a same instance of time, color information for each point on the screen is obtained from the framebuffer, thereby creating a set of pixels.

In block 56, a sampling rate (r) of the framebuffer is identified.

In block 58, an AVC encoder is utilized in the sampled data from the framebuffer.

In block 60, the data is transmitted from the call center to the vehicle, utilizing a cellular service, cloud, or similar in block 62. In addition, feedback controls (CTL) are provided for adjusting sampling rate if required.

In block 64, the data is received at a receiver buffer.

In block 66, the received data is provided to an AVC decoder for decoding the data.

In block 68, the decoded data is projected on the graphic display unit of the vehicle.

The following protocol is applied for regulating the data provided by the framebuffer. An index of a current outgoing TCP packet is represented by $p_0$. An index of a most recent acknowledged TCP packet is represented by $p_1$. The sampling rate for the framebuffer is represented by r, and $r_0$ is the lowest sampling rate supported by the system.

The protocol is as follows:

$$r = r_0$$
$$C = \text{maximum } (p_0 - p_1) \text{ during } T \text{ sec}$$
while ack recieved do
    if $(p_0 - p_1) < C_0$ for K_I_INTERVAL sec
        $r = r * 2;$
        $C_0 = \max(p_0 - p_1)$
    end if
    if $(p_0 - p_1) > C_0$ for K_D_INTERVAL sec
        $r = \frac{r}{2};$
        $C_0 = \max(p_0 - p_1)$
    end if
end while where $p_0$ is the index of the current outgoing packet, and where $p_1$ is the index of the most recent acknowledged packet, $C_0$ is a maximum $(p_0-p_1)$ during a sample interval, K_I_INTERVAL is a calibratable constant that specifies the interval required to increase the sampling rate, and K_D_INTERVAL is a sample interval that is a calibratable constant that specifies the interval required to decrease the sampling rate.

The principles of operation are to start from a lowest sampling rate r. The sampling rate r is increased when the difference between the index of the outgoing TCP packet and the index of a most recent acknowledged TCP packet $(p_0-p_1)$ is substantially constant for a predetermined duration of time (e.g., K_I_INTERVAL is 5 sec). If the difference between the index of the outgoing TCP packet and the index of a most recent acknowledged TCP packet $(p_0-p_1)$ is increasing for a second predetermined period of time (e.g., K_I_INTERVAL is 1 sec), the sampling rate r is immediately decreased. Therefore, as a jitter buffer at the vehicle is consumed, the vehicle notifies the call center to send one more framebuffer. If the call center does not receive any requests from vehicle, then the call center will not send further updates. This avoids the call center from overwhelming the vehicle unnecessarily. This protocol minimizes latency while maximizing the sampling rate and reducing the communication bandwidth to a minimum level required as compared to systems that utilize remote desktop services. It should be understood that the interval times for K_I_INTERVAL and K_D_INTERVAL are exemplary and other interval times may be utilized.

While certain embodiments of the present invention have been described in detail, those familiar with the art to which this invention relates will recognize various alternative designs and embodiments for practicing the invention as defined by the following claims.

What is claimed is:

1. A method of remotely controlling a graphic display unit comprising the steps of:
    requesting, by a host system, assistance of a remote system relating to a respective application, the host system including at least one host graphic display unit displaying operational graphics relating to a dedicated application of the host system, the remote system including a remote graphical display unit, the remote system is in wireless communication with the host system;
    accessing the at least one host graphic display unit of the host system by the remote system;
    transmitting from the remote system to the host system graphical application data relating to the respective application display;
    projecting instructional graphic information on the at least one host graphics display unit; and
    remotely controlling, by the remote system, the at least one host graphic display unit by displaying to a user of the host system instructional information relating to the respective application;
    wherein an adaptive session protocol controls a speed in which data is transmitted from the remote system to the host system, and
    wherein the adaptive session protocol applies a framebuffer for controlling a sampling rate at which data is transmitted by the remote system to the host system.

2. The method of claim 1, wherein the instructional graphic information projected on the host graphics display unit is projected as new content.

3. The method of claim 1, wherein the instructional graphic information projected on the host graphics display unit is projected as an overlay to existing content.

4. The method of claim 1, wherein the sampling rate of the framebuffer is dynamically adjusted according to packet indices at a transport layer of the host system.

5. The method of claim 4, wherein the host system communicates a request to the remote system to transmit additional data in response to data in the framebuffer being consumed.

6. The method of claim 5, wherein no data is transmitted in response to no status communication update between host system and the remote system.

7. The method of claim 4, wherein the sampling rate of the framebuffer is increased in response to a difference between an index of a current outgoing packet in the host system transport layer and an index of a most recent acknowledgement of a packet in the host system transport layer being substantially constant for a predetermined period of time.

8. The method of claim 4, wherein the dynamic adjustment of the sampling rate is determined by the following formula:

$$(P_0 - P_1) < C_0 \text{ for } K\_I\_\text{INTERVAL sec}$$

where $P_0$ is the index of the current outgoing packet, and where $P_1$ is the index of the most recent acknowledged packet, $C_0$ is a maximum ($P_0-P_1$) during a sample interval, and K_I_INTERVAL is a calibratable constant that specifies the interval required to increase the sampling rate.

9. The method of claim 8, wherein the sampling rate is increased by a multiple of the previous sampling rate.

10. The method of claim 8, wherein the sampling rate of the framebuffer is decreased in response to the difference between the index of a current outgoing packet in the host system transport layer and an index of a most recent acknowledgement of a packet in the host system transport layer increasing after a second predetermined period of time.

11. The method of claim 10, wherein the dynamic adjustment for decreasing the sampling rate is determined by the following formula:

$$(P_0-P_1)<C_0 \text{ for } K\_D\_INTERVAL \text{ sec}$$

where K_D_INTERVAL is a sample interval that is a calibratable constant that specifies the interval required to decrease the sampling rate.

12. The method of claim 11, wherein the sampling rate is a fraction of the previous sampling rate.

13. The method of claim 11, wherein the respective application which assistance is requested is an application different than the dedicated application primarily utilized on the host graphics display unit.

14. The method of claim 11, further comprising the steps of:
    requesting assistance of a remote system by a host system relating to the dedicated application displayed on the host graphic display unit;
    accessing the at least one host graphic display unit of the host system by the remote system;
    transmitting from the host system to the remote system graphical application data relating to the dedicated application displayed on a targeted host graphic display unit;
    projecting the graphical application data on the remote graphic display unit;
    remotely controlling, by the remote system, features of the dedicated application, the host graphic display unit displaying or overlaying instructional operations of the dedicated application as controlled by the remote system;
    wherein the adaptive session protocol controls the sampling rate in which data related to the dedicated application displayed on the host system is transmitted from the host system to the remote system.

15. The method of claim 14, wherein a host display client/server functions as a server, and a remote display client/server functions as a client when application data is transmitted from the host system to the remote system.

16. The method of claim 15, wherein a host graphic codec solution provides an interface between the host graphic display unit host display client/server, the host graphic codec solution encoding application data prior to transmission to the remote system, and wherein the remote graphic codec solution provides an interface between the remote graphics display unit and the remote display client/server, the remote graphic codec solution decoding application data received from the host system.

17. The method of claim 11, wherein a host display client/server functions as a client, and a remote client/server functions as a server when application data is transmitted from the remote vehicle to the host vehicle.

18. The method of claim 17, wherein a remote graphic codec solution provides an interface between the remote graphics display unit and the remote display client/server, the remote graphic codec solution encoding application data prior to transmission to the host system, and wherein the host graphic codec solution provides an interface between the host graphics display unit and the host display client/server, the host graphic codec solution decoding application data received from the remote system.

19. The method of claim 1, wherein application data is transmitted wirelessly between the host system and remote system.

20. The method of claim 1, wherein wireless communication between the host system and remote system utilizes a long term evolution data pipe for data transmission.

21. The method of claim 1, wherein the host system includes a mobile vehicle, and the remote system includes a fixed infrastructure.

\* \* \* \* \*